US 6,986,048 B1

(12) United States Patent
Epstein et al.

(10) Patent No.: US 6,986,048 B1
(45) Date of Patent: Jan. 10, 2006

(54) PROTECTING CONTENT FROM ILLICIT REPRODUCTION BY PROOF OF EXISTENCE OF A COMPLETE DATA SET USING SECURITY IDENTIFIERS

(75) Inventors: Michael A. Epstein, Spring Valley, NY (US); Robert M. McDermott, Weston, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/536,945

(22) Filed: Mar. 28, 2000

Related U.S. Application Data (60) Provisional application No. 60/177,863, filed on Jan. 24, 2000.

(51) Int. Cl.
*G06F 1/26* (2006.01)
(52) U.S. Cl. ............... 713/176; 713/182; 713/189; 713/200; 713/201; 380/200; 380/201; 705/57
(58) Field of Classification Search ........... 380/201, 380/202, 28, 54; 713/176, 179, 200–201, 713/190, 182, 189; 705/58, 57
See application file for complete search history.

(56) References Cited

U.S. PATENT DOCUMENTS

| 5,848,155 | A | * | 12/1998 | Cox .................. 382/191 |
| 5,949,885 | A | * | 9/1999 | Leighton .............. 380/54 |
| 6,108,434 | A | * | 8/2000 | Cox et al. ............ 382/100 |
| 6,157,330 | A | * | 12/2000 | Bruekers et al. ....... 341/143 |
| 6,208,735 | B1 | * | 3/2001 | Cox et al. ............ 380/54 |
| 6,285,774 | B1 | * | 9/2001 | Schumann et al. ..... 382/100 |
| 6,320,829 | B1 | * | 11/2001 | Matsumoto et al. ... 369/47.12 |
| 6,373,960 | B1 | * | 4/2002 | Conover et al. ....... 382/100 |
| 6,404,898 | B1 | * | 6/2002 | Rhoads ............... 382/100 |
| 6,463,162 | B1 | * | 10/2002 | Vora .................. 382/100 |
| 6,523,113 | B1 | * | 2/2003 | Wehrenberg .......... 713/176 |
| 6,553,127 | B1 | * | 4/2003 | Kurowski ............. 382/100 |
| 6,625,295 | B1 | * | 9/2003 | Wolfgang et al. ...... 382/100 |
| 6,654,479 | B1 | * | 11/2003 | Liao et al. ............ 380/252 |

FOREIGN PATENT DOCUMENTS

| EP | 0840513 | 5/1998 |
| EP | 0855837 | 7/1998 |

* cited by examiner

*Primary Examiner*—Gregory Morse
*Assistant Examiner*—Tongoc Tran
(74) *Attorney, Agent, or Firm*—Gregory L. Thorne (57) ABSTRACT

A number of data items are selected for inclusion in a data set so as to discourage a transmission of the entire set over a limited bandwidth communications path, such as the Internet. The data set includes an entirety parameter that is used to determine whether the entirety of the data set is present. In a preferred embodiment, the entirety parameter is a hash value that is based on watermarks of each data item. When presented for rendering, the watermarks of the data items in the presented material are read and a hash value based on the presented watermarks is computed. A mismatch between the computed hash value and the entirety hash value contained in the data set indicates that less than the entirety of the data set is being presented, and the rendering is prohibited.

40 Claims, 3 Drawing Sheets

PROTECTING CONTENT FROM ILLICIT REPRODUCTION BY PROOF OF EXISTENCE OF A COMPLETE DATA SET USING SECURITY IDENTIFIERS

CROSS-REFERENCE TO RELATED APPLICATIONS

This application claims the benefit of U.S. Provisional Application No. 60/177,863 filed Jan. 24, 2000.

BACKGROUND OF THE INVENTION

1. Field of the Invention

This invention relates primarily to the field of consumer electronics, and in particular to the protection of copy-protected content material.

2. Description of Related Art

The illicit distribution of copyright material deprives the holder of the copyright legitimate royalties for this material, and could provide the supplier of this illicitly distributed material with gains that encourage continued illicit distributions. In light of the ease of information transfer provided by the Internet, content material that is intended to be copy-protected, such as artistic renderings or other material having limited distribution rights, are susceptible to wide-scale illicit distribution. The MP3 format for storing and transmitting compressed audio files has made the wide-scale distribution of audio recordings feasible, because a 30 or 40 megabyte digital audio recording of a song can be compressed into a 3 or 4 megabyte MP3 file. Using a typical 56 kbps dial-up connection to the Internet, this MP3 file can be downloaded to a user's computer in a few minutes. Thus, a malicious party could read songs from an original and legitimate CD, encode the songs into MP3 format, and place the MP3 encoded song on the Internet for wide-scale illegitimate distribution. Alternatively, the malicious party could provide a direct dial-in service for downloading the MP3 encoded song. The illicit copy of the MP3 encoded song can be subsequently rendered by software or hardware devices, or can be decompressed and stored onto a recordable CD for playback on a conventional CD player.

A number of schemes have been proposed for limiting the reproduction of copy-protected content material. The Secure Digital Music Initiative (SDMI) and others advocate the use of "digital watermarks" to identify authorized content material. EP 0981901 "Embedding auxiliary data in a signal" issued 1 Mar. 2000 to Antonius A. C. M. Kalker, discloses a technique for watermarking electronic material, and is incorporated by reference herein. As in its paper watermark counterpart, a digital watermark is embedded in the content material so as to be detectable, but unobtrusive. An audio playback of a digital music recording containing a watermark, for example, will be substantially indistinguishable from a playback of the same recording without the watermark. A watermark detection device, however, is able to distinguish these two recordings based on the presence or absence of the watermark. Because some content material may not be copy-protected and hence may not contain a watermark, the absence of a watermark cannot be used to distinguish legitimate from illegitimate material. On the contrary, the absence of a watermark is indicative of content material that can be legitimately copied freely.

Other copy protection schemes are also available. For example, European patent EP0906700, "Method and system for transferring content information and supplemental information related thereto", issued 7 Apr. 1999 to Johan P. M. G., presents a technique for the protection of copyright material via the use of a watermark "ticket" that controls the number of times the protected material may be rendered, and is incorporated by reference herein.

An accurate reproduction of watermarked material will cause the watermark to be reproduced in the copy of the watermarked material. An inaccurate, or lossy reproduction of watermarked material, however, may not provide a reproduction of the watermark in the lossy copy of the material. A number of protection schemes, including those of the SDMI, have taken advantage of this characteristic of lossy reproduction to distinguish legitimate material from illegitimate material, based on the presence or absence of an appropriate watermark. In the SDMI scenario, two types of watermarks are defined: "robust" watermarks, and "fragile" watermarks. A robust watermark is one that is expected to survive a lossy reproduction that is designed to retain a substantial portion of the original content material, such as an MP3 encoding of an audio recording. That is, if the reproduction retains sufficient information to allow a reasonable rendering of the original recording, the robust watermark will also be retained. A fragile watermark, on the other hand, is one that is expected to be corrupted by a lossy reproduction or other illicit tampering.

In the SDMI scheme, the presence of a robust watermark indicates that the content material is copy protected, and the absence or corruption of a corresponding fragile watermark when a robust watermark is present indicates that the copy protected material has been tampered with in some manner. An SDMI compliant device is configured to refuse to render watermarked material with a corrupted watermark, or with a detected robust watermark but an absent fragile watermark, except if the corruption or absence of the watermark is justified by an "SDMI-certified" process, such as an SDMI compression of copy protected material for use on a portable player. For ease of reference and understanding, the term "render" is used herein to include any processing or transferring of the content material, such as playing, recording, converting, validating, storing, loading, and the like. This scheme serves to limit the distribution of content material via MP3 or other compression techniques, but does not affect the distribution of counterfeit unaltered (uncompressed) reproductions of content material. This limited protection is deemed commercially viable, because the cost and inconvenience of downloading an extremely large file to obtain a song will tend to discourage the theft of uncompressed content material.

BRIEF SUMMARY OF THE INVENTION

It is an object of this invention to extend the protection of copy-protected material to include the protection of uncompressed content material.

This object and others are achieved by selecting a sufficient number of data items for inclusion in a data set so as to discourage a transmission of the entire set over a limited bandwidth communications path, such as the Internet. The data set includes an entirety parameter that is used to determine whether the entirety of the data set is present. In a preferred embodiment, the entirety parameter is a hash value that is based on watermarks of each data item. When presented for rendering, the watermarks of the data items in the presented material are read and a hash value based on the presented watermarks is computed. A mis-match between the computed hash value and the entirety hash value contained in the data set indicates that less than the entirety of the data set is being presented, and the rendering is prohibited.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

For ease of understanding, the invention is presented herein in the context of digitally recorded songs. As will be evident to one of ordinary skill in the art, the invention is applicable to any recorded information that is expected to be transmitted via a limited bandwidth communications path. For example, the individual content material items may be data records in a larger database, rather than songs of an album.

The theft of an item can be discouraged by making the theft more time consuming or inconvenient than the worth of the stolen item. For example, a bolted-down safe is often used to protect small valuables, because the effort required to steal the safe will typically exceed the gain that can be expected by stealing the safe. Copending U.S. patent application "Protecting Content from Illicit Reproduction by Proof of Existence of a Complete Data Set", U.S. Ser. No. 09/537,815 filed Mar. 28, 2000 for Michael Epstein, teaches selecting and binding of data items to a data Bet that is sized sufficiently large so as to discourage a transmission of the data set via a bandwidth limited communications System, such as the Internet, and is incorporated by reference herein. This copending application teaches a binding of the data items in the data net by creating a watermark that contains a data-set-entirety parameter and embedding this watermark into each section of each data item. The copending application also teaches including a section-specific parameter (a random number assigned to each section) in the watermark.

As is known in the art, similar to the use of watermarks in currency, a watermarking system is premised on the assumption that a counterfeit watermark cannot easily be produced by an illegitimate manufacturer. As such, it can be expected that access to watermark-writing techniques will be restricted. Also, a number of other security systems, such as copy-limiting systems based on tickets, also rely on defined watermarks. The creation of a specific valued watermark for the security scheme of the copending application may be in conflict with the other security systems, or may consume more resources than is deemed worthwhile.

In accordance with this invention, the entirety of the data set is verified using an entirety verification technique that does not require the creation of specific watermarks. An entirety parameter is created when the data set is created, based on a composite of security identifiers that are associated with each data item in the data set. The security identifier of each data item is configured such that a modification to the data item results in a modification of the security identifier. When the data set is presented for rendering, a corresponding security identifier for each data item is determined, based on the presented data item, and a corresponding entirety parameter is computed. If the computed entirety parameter does not match the entirety parameter associated with the data set, subsequent rendering of the presented data items is precluded. In the context of digital audio recordings, a compliant playback or recording device is configured to refuse to render an individual song in the absence of the entire contents of the CD. The time required to download an entire album on a CD in uncompressed digital form, even at DSL and cable modem speeds, can be expected to be greater than an hour, depending upon network loading and other factors. Thus, by requiring that the entire contents of the CD be present, at a download "cost" of over an hour, the likelihood of a theft of a song via a wide-scale distribution on the Internet is substantially reduced.

As discussed above, a number of copy protection schemes have been proposed wherein copyright material, such as a song, is recorded with a substantially unique embedded watermark. In the context of such a copy protection scheme, a preferred embodiment of this invention uses the embedded watermark of each song as the security identifier, assuming that the embedded watermark includes a fragile component that is altered if the associated content material is modified. As noted above, for example, existing SDMI security schemes rely on a fragile watermark that is altered if the song undergoes an MP3 compression.

Alternative techniques may be used to determine or create a security identifier. In a non-watermark environment, for example, a checksum or other somewhat-unique identifier of the data item can be used as the security identifier, provided that the identifier is dependent upon the content of the data item. For additional security, a hash of the identifier may be used, to increase the difficulty of substituting a short data item that has the same security identifier as the original data item. For ease of reference, the invention is presented herein using the paradigm of a fragile watermark as the security identifier, although security identifiers comprising checksums, hash values, digital signatures, and the like, will be evident to one of ordinary skill in the art in view of this disclosure.

Figure 1:
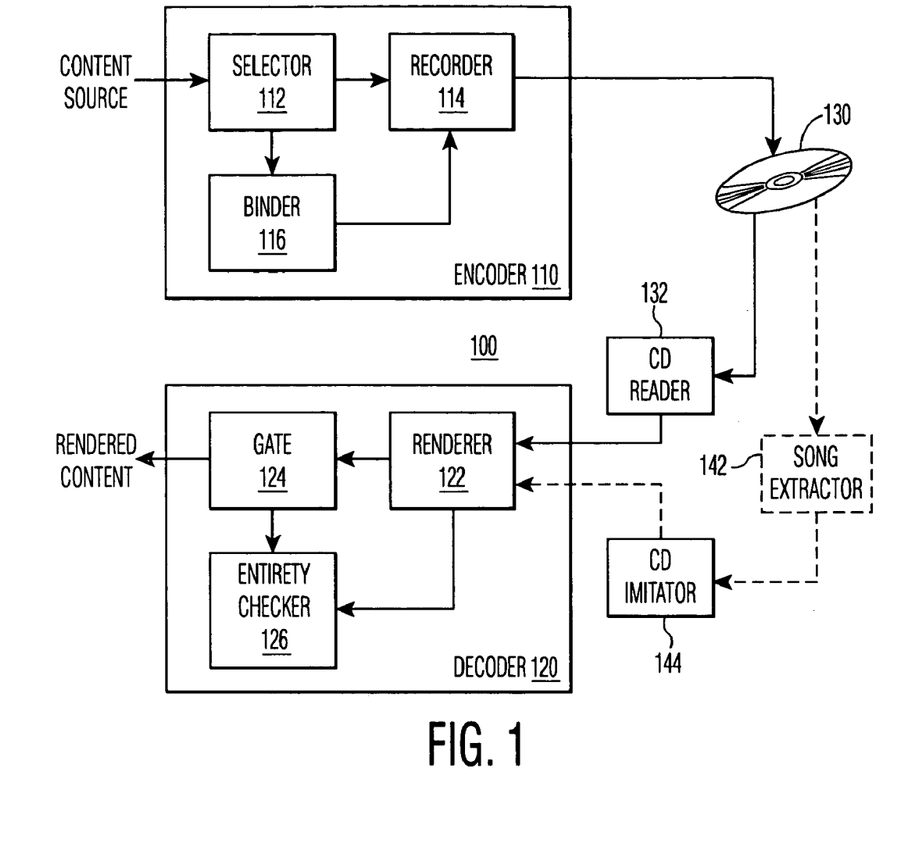
FIG. 1 illustrates an example system for protecting copy-protected content material in accordance with this invention.

FIG. 1 illustrates an example block diagram of a protection system 100 in accordance with this invention. The protection system 100 comprises an encoder 110 that encodes content material onto a medium 130, and a decoder 120 that renders the content material from the medium 130. The encoder 110 includes a selector 112 that selects content material from a source, and a recorder 114 that records this material onto the medium 130. The selector 112, for example, may be configured to select content information corresponding to songs that are being compiled into an album. The recorder 114 appropriately formats, encodes, and stores the information on the medium 130, using techniques common in the art.

In accordance with this invention, the selector 112 selects data items to be added to the data set until the size of the data set is deemed large enough to discourage a subsequent transmission of the data set via a limited bandwidth communications channel. This "discouraging size" is a subjective value, and will depend upon the assumed available communications bandwidth, the loss incurred by the transmission, and so on. Other criteria may also be used to determine whether to add additional data items to the data set. For example, if the data items correspond to songs of an existing album collection, all of the songs will typically be added to the data set, regardless of whether the size of the data set has exceeded the determined discouraging size. If all of the songs of the album collection have been selected, and the discouraging size criterion has not yet been reached, other data items are selected to accumulate the required discouraging size. For example, data items comprising random data bits may be added to the data set to increase its size. These random bits will typically be stored as out of band data, CD-ROM data, and the like, to prevent it from being rendered as audible sounds by a conventional CD player. Alternatively, the data items may comprise other sample songs that are provided to encourage the sale of other albums, or images and video sections related to the recorded content material. Similarly, promotional material, such as Internet access subscription programs may also be included in the recorded information on the recorded medium. These and other means of adding size to a data set will be evident to one of ordinary skill in the art in view of this invention. Additionally, one or more data items may be included in the data set specifically to enhance the security of this system, by introducing, for example, watermarks that are unrelated to the initial selection of data items comprising the data set. In accordance with this invention, an entirety parameter is created based on each of the included data items in the data set. A removal or alteration of any of the data items, including any random sections, promotional material, and the like that were added to increase the size of the data set, or to improve the security of the entirety parameter, will result in a different corresponding entirety parameter, and can be used to preclude the subsequent rendering of data items from a data set having a different entirety parameter.

In accordance with this invention, the encoder 110 includes a binder 116 that determines an entirety parameter that acts to bind the parameter to each item selected by the selector 112 for inclusion in the data set. In a preferred embodiment, the entirety parameter is a hash value that is based upon a composite of an entirety of the data. As discussed above, the entirety parameter is preferably based upon security identifiers associated with each data item in the data set, although the entirety parameter could be based on sub-divisions of each data item. That is, for example, in the context of digitally recorded songs, each section of the song may have a unique identifier, and the entirety parameter may be based on a composite of these section identifiers. Similarly, the entirety parameter may be a checksum that is based on each of the individual data units comprising each data item. For ease of reference, the term data item is used hereinafter to refer to the item to which the security identifier is associated, regardless of the structure of the contents of the data set.

In the context of audio recordings and consumer products, the use of a watermark as the security identifier is preferred, because rendering devices are often configured with numerous error masking techniques, and may not accurately reflect the true contents of the data items on the recording medium. For example, during playback a mis-read sector on a disc is often replaced by a prior sector, the priority being placed on providing a continuous flow of sound, rather that a discontinuous rendering of the exact sounds. In such an environment, a security identifier that is based on the presence of each and every bit in the data item may not be practical. Watermarks and watermark systems, on the other hand, are designed to provide an exact representation of the detected watermark, regardless of error masking or other effects that may affect the accuracy of the presented data.

The decoder 120 in accordance with this invention comprises a renderer 122 and a gate 124 that is controlled by an entirety checker 126. The renderer 122 is configured to retrieve information from a medium reading device, such as a CD reader 132. As is common in the art, the renderer 122 retrieves the information by specifying a location index, and in response, the reader 132 provides the data located at the specified location index on the medium 130. Block reads of data at contiguous locations on the medium 130 are effected by specifying a location index and a block size.

The dotted lines of FIG. 1 illustrate an example song extractor 142 that extracts a song from the medium 130 and communicates it to an example CD imitator 144, representative of a possible illicit download of the song via the Internet. The CD imitator 144 represents, for example, a software program that provides information in response to a conventional CD-read command. Alternatively, the information received from the song extractor can be written to a CD medium, and provided to the conventional CD reader 132. As noted above, the song extractor 142 is likely to be used because the transmission of the entirety of the contents of the medium 130 is assumed to be discouraged by the purposeful large size of the contents of the medium 130.

In accordance with this invention, the entirety checker 126 is configured to obtain data from the medium 130, typically via the renderer 122, to determine whether the entire data set is present. The renderer 122 is configured to determine the watermark, or other security identifier, associated with data items that are read from the medium 130. The entirety checker 126 uses the security identifier to determine whether the entirety of the data set is available to the renderer 122, as discussed below.

Figure 2:
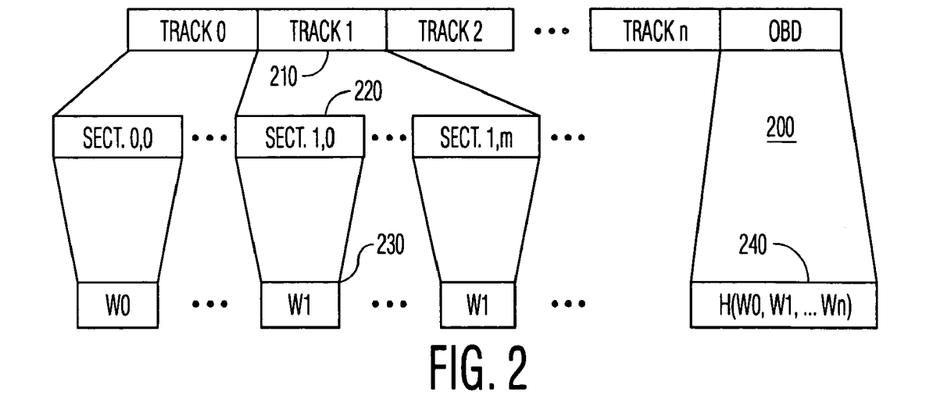
FIG. 2 illustrates an example data structure that facilitates a determination of the presence of an entirety of a data set in accordance with this invention.

FIG. 2 illustrates an example data structure 200 for storing data items in a data set that facilitates a determination of whether the entirety of the original data set is present, using the paradigm of a watermark being used as a security identifier. A track 210 and section 220 structure is illustrated, consistent with the memory structure of conventional CD and other storage media. In the example data structure 200, a watermark 230 that is associated with each track is embedded in each section 220. Track 0 has a watermark W0, track 1 has a watermark W1, and so on. Alternative watermarking schemes are common in the art, including individual watermarks associated with each section 220. In the example of FIG. 2, a hash 240 of a composite of the watermarks W0, W1, . . . Wn is stored in the data structure 200, preferably as out of band data (OBD). This hash 240, for example, may be stored within the Table of Contents of a typical CD, as "CD-ROM" data in a mixed audio-data CD, as a separate and unique data section, as a false song containing only data, and so on. Preferably, the watermarks include a combination of robust and fragile watermarks, such that a removal or alteration of the robust watermark causes damage to the corresponding data item, and an alteration of a data item causes damage to the corresponding fragile watermark.

Returning to FIG. 1, when the true or illicit copy of the content information is presented to the renderer 122, the entirety checker 126 receives each watermark, upon which the entirety parameter is based, from the renderer 122. The entirety checker 126 computes an entirety value using the same algorithm that the encoder 110 used to create the entirety parameter. In the example of FIG. 2, the entirety value is a hash of the watermarks provided by the renderer, using the same hash function that is used to create the entirety parameter 240. The entirety checker 126 receives the entirety parameter 240 from the renderer 122, and compares it to this computed hash of the provided watermarks. If the entirety parameter 240 and the computed hash do not match, the entirety checker 126 prevents the rendering of subsequent data items from the apparently illicit source, via the gate 124.

In a preferred embodiment, the entirety parameter is also bound to the table of contents for the data set, because the entirety checker 126 uses the table of contents to determine the number of tracks, and the number of sections within each track. This binding serves to prevent a substitution of a shortened data set comprising, for example, a single section per track. Alternatively, the size of a data set in accordance with this invention can be assumed to contain a specified minimum number of sections. Using this assumption, the entirety checker can be configured to prevent the rendering of the content material if the total number of sections included in a foreshortened table of contents does not amount to this specified minimum.

Other security systems, not illustrated in FIG. 1, may also be employed to control the gate 124, including those that rely on the value of the individual watermarks, such as the above referenced European patent EP983687A2, which uses of a watermark "ticket" that controls the number of times the protected material may be rendered. That is, by using existing or predefined watermarks, such as the aforementioned "ticket", to create the entirety parameter, the data structure in accordance with this invention is compatible with other systems that use or specify these watermarks. The example gate 124 is presented for ease of understanding. Any of a variety of techniques can be employed to prevent the rendering of material, including a direct control of the renderer 122, a control of another device, such as a power supply to the renderer 122, and so on.

Depending upon the degree of security desired, relative to the time required to effect this security, the composite of the watermarks may be based on fewer than all of the watermarks available. For example, a set of entirety parameters may be defined, each entirety parameter corresponding to a predefined subset of the available watermarks. For example, a subset of watermarks may comprise every other watermark, every third watermark, every watermark that is not divisible by two, three, or seven, or any other collection of watermarks that can be commonly known among all compliant decoders. An algorithmically determined selection of members of each subset is preferred, so that a compliant decoder can determine the members of each subset of watermarks, regardless of the particular data set being presented. The decoder 120 in this example randomly picks one (or more) of the set of entirety parameters as the entirety parameter to verify, and performs the verification based on the subset of watermarks corresponding to the randomly selected entirety parameter. Even though each entirety parameter only verifies the presence of a subset of the data set, an illicit copy of the data set will need to contain the entirety of the data set, because the choice of which subset of watermarks will be verified is determined when the material is being rendered. An illicit copy of the data set comprising, for example, every other song of an album, may be verified as being complete by some sets of watermarks, but would be found to be incomplete by other sets, such as a set of every third watermark in the original data set. In a preferred embodiment, the set of entirety parameters is defined such that each watermark is included in at least one corresponding subset of watermarks. To allow for an exhaustive verification, one of the entirety parameters in a preferred embodiment corresponds to the set of all watermarks.

Figure 3:
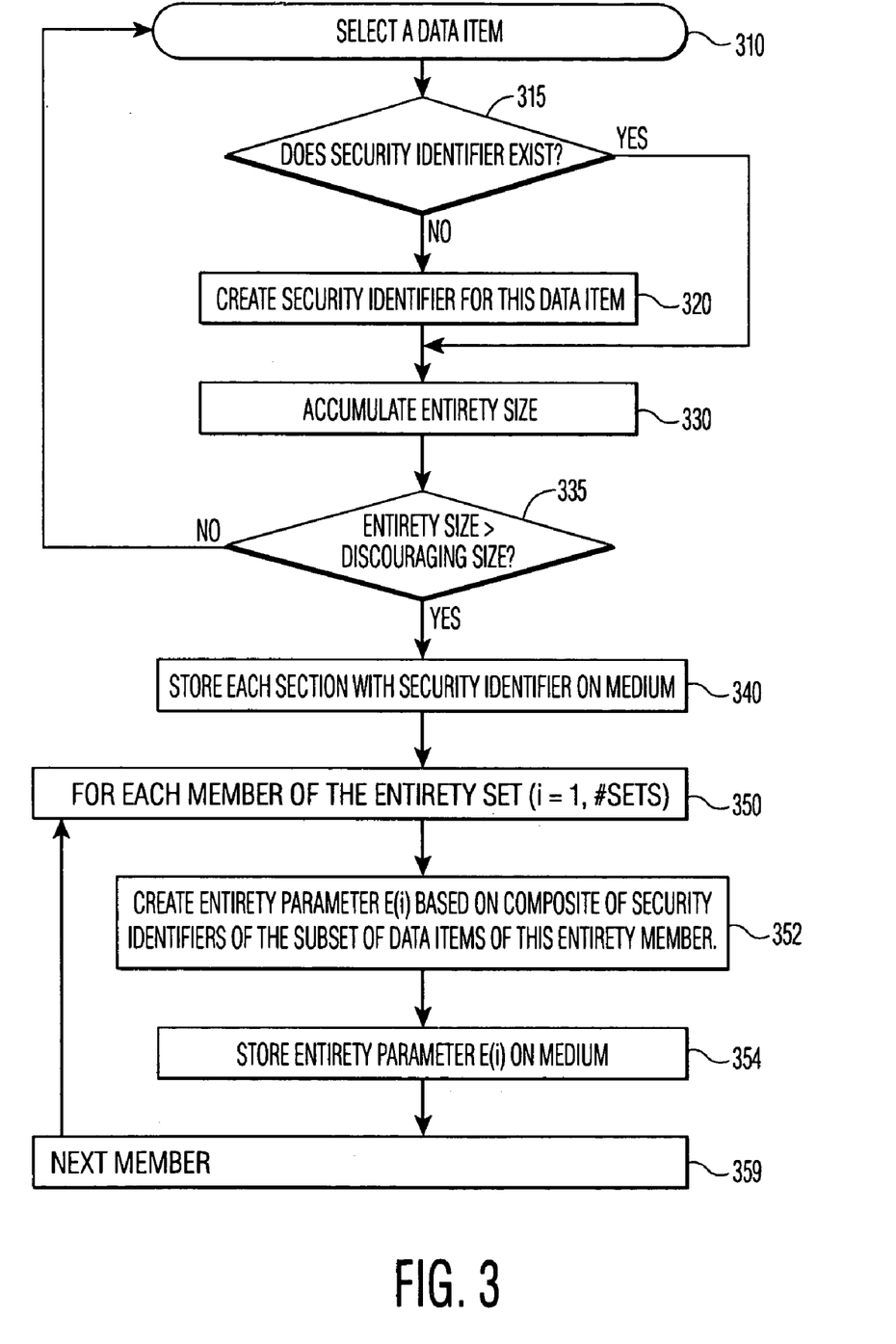
FIG. 3 illustrates an example flow diagram for an encoder that creates and records a data set and an entirety parameter corresponding to the data set in accordance with this invention.

FIG. 3 illustrates an example flow diagram for an encoder 110 in accordance with this invention. The loop 310–335 creates a data set that contains a collection of data items, as discussed above. For each selected data item, a security item is created, at 320, except if, at 315, a security item already exists for this data item. For example, a digitally recorded song may include one or more watermarks that are embedded in the song, as discussed above. In the field of data processing, a checksum may be created for each data record. In the field of video, a parameter of a particular block, such as the low-order bits of an encoding of the block within each independent frame, may be used as a security item. Not illustrated, the value of the security item is temporarily stored, for use at step 352 to create one or more entirety parameters. As each data item is selected, the accumulated size of the data set is computed, at 330. Subsequent data items are accumulated into the data set until, at 335, the size is deemed sufficient to discourage a subsequent transmission via a limited bandwidth communication channel, as discussed above. Each section is stored on the medium, at 340, with its security identifier.

The loop 350–359 creates and stores one or more entirety parameters on the medium, for use by a decoder to determine whether an entirety of the data set is present on a subsequent copy of some or all of the data items in the data set. As discussed above, to facilitate a rapid statistical verification that an entirety of the data is present, a set of entirety parameters are created, each entirety parameter of the entirety set corresponding to a subset of data items within the data set. Preferably, the subset of data items corresponding to each entirety parameter is algorithmically determinable, so that the correspondence is determinable at each decoder. Alternatively, a "membership list" that explicitly or algorithmically defines each entirety parameter's associated subset of data items, can be recorded on the medium. At 352, the entirety parameter corresponding to the appropriate subset of data items is created. In a preferred embodiment, this entirety parameter is a hash of the security identifiers of each data item in the subset of data items associated with the entirety parameter. At 354, this entirety parameter is stored on the medium, preferably in a secure form, such as an embedded watermark, or an item that is bound to another item, such as a table of contents.

Figure 4:
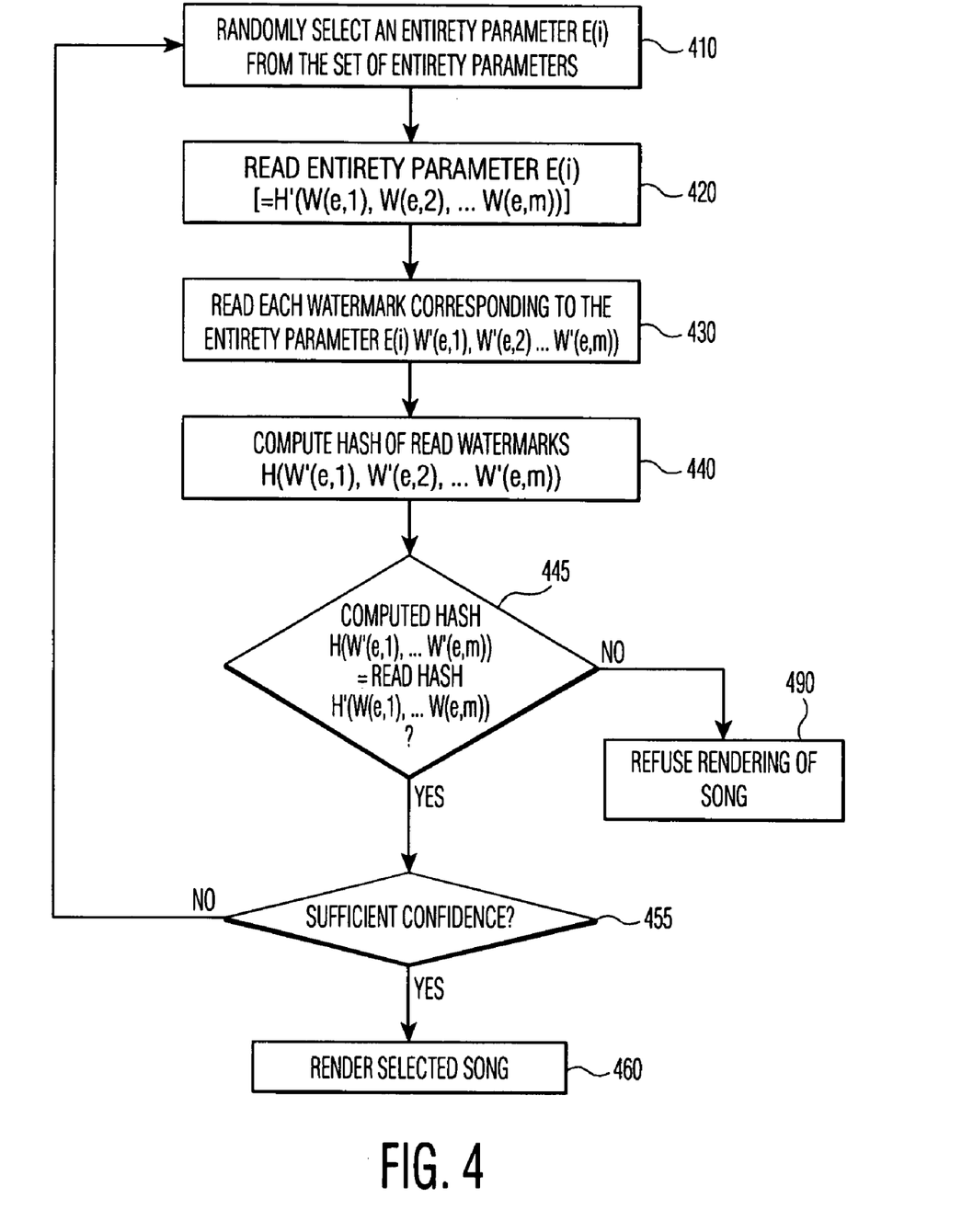
FIG. 4 illustrates an example flow diagram of a decoding system that renders content material in dependence upon a verification of the presence of an entirety of a data set in accordance with this invention.

FIG. 4 illustrates an example flow diagram for a decoder 120 in accordance with this invention. It is assumed that the process of FIG. 4 is invoked after it is determined that a requested data item, such as a song from a CD, is a member of a copy protected data set, via, for example, the presence of a watermark, an entry in the table of contents, and so on. At 410, an entirety parameter is selected from among the set of entirety parameters associated with the data set. If only one entirety parameter is available for selection, it is selected. The selected entirety parameter is read, at 420. As noted above, in the digital audio field, this entirety parameter is preferably a hash of a composite of the subset of watermarks associated with the selected entirety parameter: H'(W(e,1), W(e,2), . . . W(e,m)), where e is an index corresponding to the selected entirety parameter, m is the number of watermarks in the subset, and the prime (') annotation denotes a value read from the medium; if the material presented to the decoder is the original recording, the primed values and unprimed values are equal. At 430, each of the watermarks comprising the subset of watermarks associated with the selected entirety parameter is read (W'(e,1), W'(e, 2), ... W'(e,m)), and an entirety value is computed based on a composite of theses watermarks H(W'(e,1), W'(e,2), ... W'(e,m)), at 440, using the same process that was used to generate the entirety parameter in the original recording. If, at 445, this computed entirety value is not equal to the read entirety parameter, implying a modification to the content material or the entirety parameter, the rendering of the song is precluded, at 490. If this computed entirety value corresponds to the read entirety value, another random entirety value may be selected and verified, via 455 to 410, until sufficient confidence is gained that the entirety of the data set is present. As noted above, in a preferred embodiment, one of the set of entirety parameters corresponds to a composite of all of the watermarks, and absolute confidence can be gained that the entirety of the data set is present by selected this entirety parameter at the first entry to block 410. When, at 455, sufficient confidence is gained that the entirety of the data set is present in the material presented to be rendered, the selected data item of the data set is rendered, at 460. Other data structures based on different security identifier schemes would be processed in a manner appropriate to the particular scheme.

To minimize the delay introduced by the above verification scheme, assuming that the CD reader 132 can present information to the renderer 122 at greater than the speed required for rendering, the decoder 120 of FIG. 1 may be structured so as to initiate the rendering of the content material while the watermarks are being read, and then terminate the rendering as soon as it is determined that the computed entirety value does not match the corresponding stored entirety parameter.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the examples presented above illustrate each part of the recorded material being part of the data set. In an alternative embodiment, select data items, or select parts of data items, may be used to form the data set, for efficiency purposes. For example, the tail end of songs may not be part of the "data set" as defined herein, because the watermark process may be based on a fixed block-size for each watermark, or each redundant copy of the watermark. If, for example, the watermark, or other parameter, requires ten seconds of a recording for a reliable embedding, the remainder of ((the song's length) modulo (10 seconds)) will be recorded on the medium, but not included in the "data set" whose entirety is being checked. In like manner, some promotional material may be included on the recorded medium, but purposely excluded from the data set, so that it may be freely copied and rendered elsewhere. Note also that the example flow diagrams are presented for ease of understanding, and the particular arrangement and sequence of steps are presented for illustration. For example, simple equalities are illustrated in the decision blocks for determining correspondence, whereas depending upon the particular techniques used to encode or decode the parameters, the assessment as to whether the read item corresponds to a determined item can include a variety of intermediate processes. These processes may include, for example, a decryption of items based on particular keys, fuzzy logic or statistical testing to determine if two values are "close enough" to imply a correspondence, and the like. Variations such as these and others will be evident to one of ordinary skill in the art in view of this invention, and are included in the spirit and scope of the following claims.

We claim:

1. A method for discouraging a theft of content material comprising:
    collecting a plurality of data items comprising the content material to form a data set that is sized to be sufficiently large so as to discourage a subsequent transmission of the data set via a limited bandwidth communications channel,
        each of the plurality of data items having an associated security identifier that is configured such that a modification of the data item effects a modification of the security identifier,
    creating an entirety parameter based on a plurality of the security identifiers; and
    including the entirety parameter in the data set to facilitate a preclusion of processing of a select data item of the plurality of data items in the absence of an entirety of the data set.

2. The method of claim 1, wherein
    the entirety parameter includes a hash value of a composite of the plurality of security identifiers.

3. The method of claim 1, wherein
    the security identifier includes at least one of:
        a watermark that is embedded in the corresponding data item
        a hash value that is based on the corresponding data item.

4. The method of claim 3, wherein
    the watermark includes:
        a robust watermark that is configured such that a removal of the robust watermark causes a corruption of the corresponding data item, and
        a fragile watermark that is configured such that a modification of the corresponding data item causes a corruption of the fragile watermark.

5. The method of claim 3, wherein
    the entirety parameter includes a hash value of a composite of the watermarks corresponding to the plurality of security identifiers.

6. The method of claim 1, wherein the plurality of data items includes a plurality of at least one of: digitally encoded audio content, and digitally encoded video content.

7. The method of claim 1, wherein the entirety parameter is bound to a table of contents that is associated with the data set.

8. The method of claim 1, further including:
    creating a plurality of other entirety parameters, each of the plurality of other entirety parameters being based on an associated plurality of security identifiers, and
    including the plurality of other entirety parameters in the data set to further facilitate a preclusion of processing of each data item in the absence of an entirety of the data set.

9. A method of decoding content material from a source comprising:
    reading an entirety parameter corresponding to the content material from the source,
    reading a plurality of security identifiers from the source, upon which the entirety parameter is based, each security identifier corresponding to a data item of the content material,
    determining an entirety value based on the plurality of security identifiers, rendering the content material from the source in dependence upon a correspondence between the entirety value and the entirety parameter.

10. The method of claim 9, wherein
reading the entirety parameter includes a random selection from a set of entirety parameters, each entirety parameter of the set of entirety parameters having an associated set of security identifiers.

11. The method of claim 9, wherein
the entirety parameter includes a hash value of a composite of the plurality of security identifiers.

12. The method of claim 9, wherein
the security identifier includes at least one of:
a watermark that is embedded in the corresponding data item
a hash value that is based on the corresponding data item.

13. The method of claim 12, wherein
the watermark includes:
a robust watermark that is configured such that a removal of the robust watermark causes a corruption of the corresponding data item, and
a fragile watermark that is configured such that a modification of the corresponding data item causes a corruption of the fragile watermark.

14. The method of claim 12, wherein
the entirety parameter includes a hash value of a composite of the watermarks corresponding to the plurality of security identifiers.

15. The method of claim 9, wherein the plurality of data items includes a plurality of at least one of: digitally encoded audio content, and digitally encoded video content.

16. The method of claim 9, wherein the entirety parameter is bound to a table of contents that is associated with the content material.

17. A storage medium that is configured to contain content material, the storage medium comprising
a data structure that includes:
a plurality of data items, each data item having an associated security identifier, and
an entirety parameter that is dependent upon a plurality of the security identifiers; and
wherein
each security identifier of the plurality of security identifiers is configured such that a modification of the data item effects a modification of the security identifier, and
the entirety parameter facilitates a determination of whether an entirety of the plurality of data items is present on a subsequent copy of at least a portion of the plurality of data items.

18. The storage medium of claim 17, further including
a plurality of other entirety parameters, each of the plurality of other entirety parameters being dependent upon an associated plurality of security identifiers.

19. The storage medium of claim 17, wherein
the entirety parameter includes a hash value of a composite of the plurality of security identifiers.

20. The storage medium of claim 17, wherein
the security identifier includes at least one of:
a watermark that is embedded in the corresponding data item
a hash value that is based on the corresponding data item.

21. The storage medium of claim 20, wherein
the watermark includes:
a robust watermark that is configured such that a removal of the robust watermark causes a corruption of the corresponding data item, and
a fragile watermark that is configured such that a modification of the corresponding data item causes a corruption of the fragile watermark.

22. The storage medium of claim 20, wherein
the entirety parameter includes a hash value of a composite of the watermarks corresponding to the plurality of security identifiers.

23. The storage medium of claim 17, wherein the plurality of data items includes a plurality of at least one of: digitally encoded audio content, and digitally encoded video content.

24. The storage medium of claim 17, wherein the entirety parameter is bound to a table of contents that is associated with the data set.

25. An encoder of content material comprising:
a selector that is configured to select a plurality of data items comprising the content material to form a data set that is sized to be sufficiently large so as to discourage a subsequent transmission of the data set via a limited bandwidth communications channel,
each of the plurality of data items having an associated security identifier that is configured such that a modification of the data item effects a modification of the security identifier,
a binder that is configured to create an entirety parameter based on a plurality of the security identifiers that facilitates a determination of whether an entirety of the plurality of data items is present, and
a recorder that is configured to combine the entirety parameter with the plurality of data items to form a self-referential data set that is stored on a recorded medium.

26. The encoder of claim 25, wherein
the entirety parameter includes a hash value of a composite of the plurality of security identifiers.

27. The encoder of claim 25, wherein
the security identifier includes at least one of:
a watermark that is embedded in the corresponding data item
a hash value that is based on the corresponding data item.

28. The encoder of claim 27, wherein
the watermark includes:
a robust watermark that is configured such that a removal of the robust watermark causes a corruption of the corresponding data item, and
a fragile watermark that is configured such that a modification of the corresponding data item causes a corruption of the fragile watermark.

29. The encoder of claim 27, wherein
the entirety parameter includes a hash value of a composite of the watermarks corresponding to the plurality of security identifiers.

30. The encoder of claim 25, wherein the plurality of data items includes a plurality of at least one of: digitally encoded audio content, and digitally encoded video content.

31. The encoder of claim 25, wherein
the binder is further configured to bind the entirety parameter to a table of contents that is associated with the data set.

32. The encoder of claim 25, wherein
the binder is further configured to create a plurality of other entirety parameters, each of the plurality of other entire parameters being based on an associated plurality of security identifiers, and
the recorder is further configured to combine the plurality of other entirety parameters with the data set to further facilitate a preclusion of processing of each data item in the absence of an entirety of the data set.

33. A decoder of content material comprising:
a renderer that is configured to receive:
   an entirety parameter corresponding to the content material, and
   a plurality of security identifiers upon which the entirety parameter is based, each security identifier corresponding to a data item of the content material,
an entirety checker, operably coupled to the renderer, that is configured to
   determine an entirety value based on the plurality of security identifiers, and
   preclude a rendering of the content material from the source in dependence upon a correspondence between the entirety value and the entirety parameter.

34. The decoder of claim 33, wherein
the renderer is further configured to receive the entirety parameter based on a random selection from a set of entirety parameters, each entirety parameter of the set of entirety parameters having an associated set of security identifiers.

35. The decoder of claim 33, wherein
the entirety parameter includes a hash value of a composite of the plurality of security identifiers.

36. The decoder of claim 33, wherein
the security identifier includes at least one of
   a watermark that is embedded in the corresponding data item
   a hash value that is based on the corresponding data item.

37. The decoder of claim 36, wherein
the watermark includes:
   a robust watermark that is configured such that a removal of the robust watermark causes a corruption of the corresponding data item, and
   a fragile watermark that is configured such that a modification of the corresponding data item causes a corruption of the fragile watermark.

38. The decoder of claim 36, wherein
the entirety parameter includes a hash value of a composite of the watermarks corresponding to the plurality of security identifiers.

39. The decoder of claim 33, wherein the plurality of data items includes a plurality of at least one of digitally encoded audio content, and digitally encoded video content.

40. The decoder of claim 33, wherein the entirety parameter is bound to a table of contents that is associated with the content material.

* * * * *